United States Patent [19]

Tsuno

[11] Patent Number: 4,746,582

[45] Date of Patent: May 24, 1988

[54] CERAMIC-METAL COMPOSITE BODY

[75] Inventor: Nobuo Tsuno, Kasugai, Japan

[73] Assignee: NGK Insulators, Ltd., Japan

[21] Appl. No.: 1,750

[22] Filed: Jan. 9, 1987

[30] Foreign Application Priority Data

Feb. 5, 1986 [JP] Japan .................................. 61-22067

[51] Int. Cl.[4] ............................................. B32B 15/04
[52] U.S. Cl. .................................... 428/627; 428/632;
428/650; 428/653; 428/673; 428/676; 428/681;
92/212; 92/213; 92/224
[58] Field of Search ............... 428/627, 632, 650, 653,
428/673, 676, 681; 92/212, 213, 224

[56] References Cited

U.S. PATENT DOCUMENTS

| 3,395,443 | 8/1968 | Polinko | 428/676 |
| 3,664,816 | 5/1972 | Finnegan | 428/653 |
| 4,559,277 | 12/1985 | Ito | 428/627 |
| 4,594,973 | 6/1986 | Allred et al. | 428/627 |

FOREIGN PATENT DOCUMENTS 0135937  4/1985  European Pat. Off. .

OTHER PUBLICATIONS

Patent Abstract of Japan, vol. 9, No. 176 (M-398) [1899], 20th Jul. 1985. (And Translation).
Patent Abstract of Japan, vol. 8, No. 143 (M-306) [1580], 4th Jul. 1984. (And translation).

Primary Examiner—L. Dewayne Rutledge
Assistant Examiner—George Wyszomierski
Attorney, Agent, or Firm—Parkhurst & Oliff

[57] ABSTRACT

A ceramic-metal composite body including (a) a ceramic member, (b) a ferrous metal member bonded to the ceramic member, (c) an intermediate metallic member joined to the iron base member, and (d) an aluminum member bonded to the intermediate metallic member. The ceramic member and the aluminum member are integrally joined through the ferrous metal member and the intermediate metallic member.

4 Claims, 2 Drawing Sheets

FIG_1
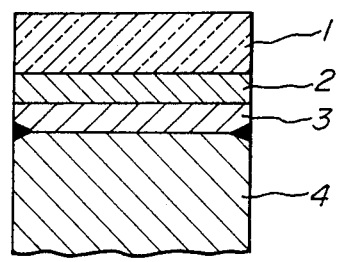
FIG_2
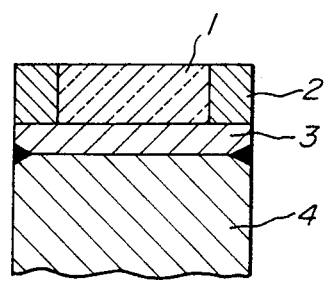

FIG_3
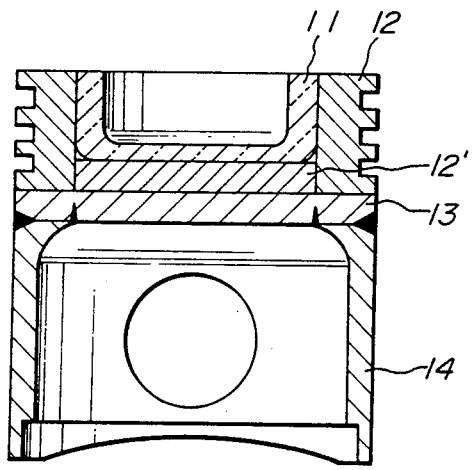
FIG_4
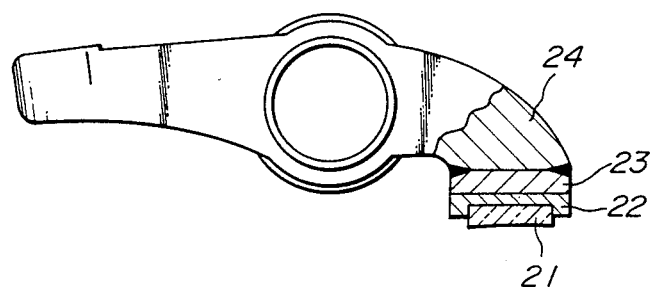

CERAMIC-METAL COMPOSITE BODY

BACKGROUND OF THE INVENTION

(1) Field of the Invention

The present invention relates to a ceramic-metal composite body. More particularly, the invention relates to a ceramic-metal composite body in which an aluminum member and a ceramic member are integrally joined to each other through a ferrous metal member and an intermediate metallic member.

(2) Related Art Statement

Since aluminum has a small specific gravity as well as excellent ductility and corrosion resistance, it is used as structural materials and parts for aircrafts, vehicles, ships, industrial machines, etc. However, aluminum has a low melting point and is soft, so that it has poor heat and wear resistance.

To the contrary, ceramics have excellent heat and wear resistance. Thus, techniques have heretofore been investigated to join a ceramic member to a part of the aluminum member to form mechanical parts having light weight as well as excellent heat and wear resistance, such as pistons, rocker arms, etc. of internal combustion engines.

For example, Japanese Utility Model Registration application Laid-open No. 59-130,047 discloses a piston for an internal combustion engine in which an iron frame body with a threaded portion is shrinkage-fitted around the outer periphery of a ceramic sintered boy and the threaded portion of the frame body is screwed to a screw portion formed at a head portion of an aluminum alloy piston body.

In Japanese patent application Laid-open No. 56-122,659, there is disclosed a process for shrinkage-fitting a ferrous metallic member around the outer periphery of a ceramic top plate, and casting an aluminum alloy as a piston body around the metallic member.

Besides, Japanese Utility Model Registration application Laid-open No. 58-178,401 discloses a rocker arm for internal combustion engines, in which a ceramic tip is bonded to a rocker arm body with an organic adhesive.

Moreover, the piston disclosed in Japanese Utility Model application Laid-open No. 59-130,047 has a shortcoming wherein the connecting of the parts through screwing, causes an explosive pressure and a compression pressure to be lowered by an unnecessary space present at the threaded portion to reduce an engine efficiency. Further, since it is extremely difficult to always fix the positional relation between the ceramic member and the piston body through screwing, a special contrivance is necessary to constantly fix the positional relation beteen the ceramic member and the piston body.

On the other hand, the casting method disclosed in Japanese patent application Laid-open No. 56-122,659 has shortcomings that the structure of a mold becomes complicated, and careful attention is necessary lest the ceramic member should be broken during the casting or in a working step subsequent to the casting. Therefore, a specialized technique is required to enhance working automation.

Furthermore, the composite body using the organic adhesive as disclosed in Japanese Utility Model Resistration application Laid-open No. 58-178,401 has a shortcoming in that it can not be used in the case where a temperature at the joint rises.

As mentioned above, the composite bodies in which the ceramic member is joined to the aluminum member according to the heretofore proposed screwing, casting or bonding method have not been satisfactory.

To the contrary, a variety of other welding methods such as fusion welding, pressure welding, and brazing may be considered as methods appropriate for joining the ceramic member and the aluminum member. However, the ceramic member and the aluminum member cannot be fusion-welded or brazed together in ordinary manners.

Even if the ferrous metal member is fitted to the ceramic member as disclosed in Japanese Utility Model Resistration application Laid-open No. 59-130,047 and Japanese patent Laid-open No. 56-122,659, the ferrous metal member cannot be fusion-welded to the aluminum member. For, since the fusion welding is a method of joining two members by partially fusing both of them and where the temperature difference in melting point between the ferrous metal member and the aluminum member is too great, the aluminum member melts before the ferrous metal member melts.

SUMMARY OF THE INVENTION

Therefore, the present invention has arisen in view of the above conventional problems, and is to provide ceramic-metal composite bodies having excellent wear and heat resistance and being easy to produce and handle, wherein a ceramic member is integrally joined to an aluminum member through a ferrous metal member and an intermediate metallic member. According to the present invention, the above object can be accomplished through the provision of the ceramic-metal composite body comprising (a) a ceramic member, (b) a ferrous metal member joined to the ceramic member, (c) an intermediate metallic member joined to the ferrous metal member, and (d) an aluminum member joined to the intermediate metallic member, wherein the ceramic member and the aluminum member are integrally joined together by the ferrous metal member and the intermediate metallic member.

By so doing, the ceramic-metal composite bodies having excellent heat resistance, wear resistance and corrosion resistance as attributes of the ceramic as well as light weight and highly ductility as attributes of the aluminum can be obtained.

These and other objects, features, and advantages of the invention will be appreciated upon reading of the following description of the invention when taken in conjunction with the attached drawings with a understanding that some modifications, variations and changes of the same could be made by the skilled person in the art to which the invention pertains without departing from the spirit of the invention or the scope of claims appended hereto.

BRIEF DESCRIPTION OF THE INVENTION

For a better understanding of the invention, reference is made to the attached drawings, wherein:

FIG. 1 is a sectional view illustrating an embodiment of the ceramic-metal composite body according to the present invention;

FIG. 2 is a sectional view of another embodiment of the ceramic-metal composite body according to the present invention; and FIGS. 3 and 4 are sectional views illustrating concrete applications of the ceramic-metal composite bodies according to the present invention.

DETAILED DESCRIPTION OF THE INVENTION

The ceramic member constituting the ceramic-metal composite body according to the present invention, may be made of oxide ceramics, nitride ceramics, and carbide ceramics.

When mechanical parts such as engine parts which are used in high temperatures are to be constituted by the ceramic-metal composite bodies according to the present invention, non-oxide ceramics having excellent high temperature strength, wear resistance and thermal shock resistance are the preferred ceramics. More particularly, at least one kind of ceramic material selected from a group consisting of silicon nitride, silicon carbide and sialon is desired.

In order to produce mechanical parts such as bearings which are not subjected to high temperatures, a variety of oxide ceramics may be used as the ceramics.

As for the ferrous metal member, metallic materials having a coefficient of thermal expansion near that of the ceramic member are preferred. Such metals include, for instance, an Fe-Ni alloy, an Fe-Ni-Co alloy, a stainless steel, and an austenitic spheroidal graphite cast iron. Among them, the Fe-Ni alloys may include not only alloys consisting of Fe and Ni, such as 42 alloy and 52 alloy, but also low expansion alloys containing a small amount of other element or elements, such as Invar. Similarly, the Fe-Ni-Co alloy includes not only alloys consisting of Fe, Ni and Co, for instance, Kovar, super Invar, etc., but also low expansion alloys containing a small amount of other element or elements, such as Incoloy 903 may be used.

The stainless steel is a stainless steel having a small coefficient of thermal expansion, for example, ferritic stainless steels, martensitic stainless steels, precipitation hardening stainless steels, etc.

Further, as to the intermediate metallic member according to the present invention, metals which have melting points lower than that of the ferrous metal member but equal to or higher than that of the aluminum member and can be welded to the aluminum member are preferred. Such a metal is preferably at least one kind of a metal selected from a group consisting of aluminum, aluminum alloys, copper, copper alloys, silver and silver alloys. Aluminum and aluminum alloys are more preferred.

Furthermore, as the aluminum member used in the present invention, a material having excellent weldability is selectively used among extendable materials or cast materials of pure aluminum and aluminum alloys. The above pure aluminum means aluminum having a purity equal to or more than that of an industrial grade pure aluminum corresponding to JIS 1100. Among the extendable materials in the aluminum alloy, alloys of Al-Mn system, Al-Mn-Mg system, Al-Mg system and Al-Mg-Si system are preferred. Among them, Al-Mn system, and Al-Mg system, Al-Mg-Si system are particularly preferred. As these aluminum alloys, use may be made of, for instance, Al-Mn system: JIS-3003, Al-Mn-Mg system : JIS-3004, Al-Mg system: JIS-5005, 5050, 5052, 5083, 5086, Al-Mg-Si system: JIS-6061. Among them, use may be made of alloys specified in aluminum cast alloy and aluminum alloy die cast in JIS H5302 as materials to be cast.

Next, methods of joining the respective members in the present invention will be explained below.

First, the ceramic member and the ferrous metal member are joined together by using a bonding method, an interference fitting method or a combination thereof.

In the method, brazing and diffusion-bonding can be used.

When the ceramic member is made of oxide ceramics, a ceramic member and a metallic member are bonded together after a surface portion of the ceramic member to be bonded to the metallic member is metallized, as described in U.S. Pat. No. 4,485,150.

In addition, when the ceramic member is made of non-oxide ceramics such as silicon nitride or silicon carbide, a solder containing such an active metal or an active metal is used as a part of an insert to enhance the bonding. In the latter case, the ceramic member and the metallic member can be joined together while the surface of the ceramic member is not metallized. On the other hand, the interference fitting may include shrinkage fitting, expansion fitting, and press fitting.

The above-mentioned joining methods are appropriately selected depending upon the kind and the shape of the ceramic member and the use purpose.

The ferrous metal member and the intermediate metallic member can be joined together according to the method ordinarily used for joining metals. For instance, such may be fusion welding, pressure welding, brazing, etc.

A variety of welding techniques described in an up-to-date joining technology manual published by KK Sangyo Gijutsu Service Center may be used for bonding the intermediate metallic member and the aluminum member. Among the welding techniques described in this publication, a shielded-arc welding, an inert gas arc welding, an oxygen acetylene gas welding, a spot welding, a butt welding, a brazing, an electron beam welding, and a friction welding are preferred. Among them, the inert gas arc welding, the oxygen acetylene gas welding, the electron beam welding are particularly preferred.

Next, the present invention will be detailed based on the following specific examples with respect to the attached drawings.

FIGS. 1 and 2 are sectional views illustrating joined structure of embodiments of the ceramic-metal composite body according to the present invention.

In the ceramic-metal composite body of FIG. 1, one side surface of a discoidal ferrous metal member 2 is joined to one side surface of a discoidal ceramic member 1, and a discoidal intermediate metallic member 3 is joined to the other side surface of the ferrous metal member 2. In turn, a column-like aluminum member 4 is welded to the other side surface of the intermediate metallic member 3.

Next, in the ceramic-metal composite body of FIG. 2, a ferrous metal member 2 of a cylindrical shape is interference fitted around the outer periphery of the discoidal ceramic member 1, and a discoidal intermediate metallic member 3 is joined to one side surface of the discoidal ferrous metal member 2. Further, a discoidal aluminum member 4 is welded to the other side surface of the intermediate metallic member 3.

FIG. 3 shows an embodiment of a joining structure of a piston using ceramic-metal composite body according to the present invention in which a piston head is constituted by a ceramic member and a ferrous metal member, while a piston body is constituted by an aluminum alloy.

In FIG. 3, a discoidal ferrous metal member 12' is joined to the outer surface of the bottom of a depressed ceramic member 11 constituting a part of a piston head, and a cylindrical ferrous metal member 12 is interference fitted around the outer periphery of the depressed ceramic member 11. A discoidal intermediate metallic member 13 is bonded to both one side surface of the metallic member 12' and one end of the ferrous metal member 12. Further, an aluminum member 14 corresponding to a piston body is welded to the other side surface of the intermediate metallic member 13.

The piston constructed as shown in FIG. 3 can be produced, for instance, in the following manner.

First, a ceramic member 11, a ferrous metal member 12, a ferrous metal member 12', an intermediate metallic member 13 and an aluminum member 14 having respective shapes are prepared. Then, the ferrous metal member 12' is brazed to the bottom outer surface of the ceramic member 11. At that time, the outer diameter of the ferrous metal member 12' is designed equal to or smaller than that of the ceramic member 11. When the bottom outer surface of the ceramic member 11 is preliminarily metallized, an ordinary solder such as silver solder has only to be used. On the other hand, when the bottom outer surface of the ceramic member 11 is not metallized, brazing is effected by using an active metal solder.

As the active metal solder, an alloy containing at least one kind of a metal selected from a group consisting of Zr, Ti, B, Hf, V, Cr, La, Sc, Y, Ce, Be and Mo as an active metal, a metal sheet coated with the above active metal, or a laminate of a foil of the above active metal and a metal sheet is preferred. The metal sheet coated with the active metal is particularly preferred.

After the brazing between the ceramic member 11 and the ferrous metal member 12' is completed, the ferrous metal member 12 is interference fitted around the outer periphery of the ceramic member 11 and the ferrous metal member 12'. This fitting may be carried out by shrinkage fitting or press fitting.

After the fitting, the intermediate metallic member 13 is bonded to the thus fitted assembly.

Finally, the intermediate metallic member 13 bonded to the fitted assembly is welded to the aluminum member 14, which is finished to a piston.

FIG. 4 shows an embodiment of a joined structure in which a rocker arm of an internal combustion engine having a ceramic member at a tip is formed by using the ceramic-metal composite body according to the present invention. In FIG. 4, a ceramic member 21 is joined to the tip end of an aluminum member 24 corresponding to the rocker arm made of an aluminum alloy through a ferrous metal member 22 and an intermediate metallic member 23.

The rocker arm constituted as shown in FIG. 4 can be produced, for instance, in the following manner.

First, a ceramic member 21, a ferrous metal member 22, an intermediate metallic member 23 and an aluminum member 24 having respective shapes are prepared. Then, after one side surface of the ceramic member 21 is joined to one side surface of the ferrous metal member 22, one side surface of the intermediate metallic member is joined to the other side surface of the ferrous metal member to form a joined assembly consisting of the ceramic member 21 on one end and the intermediate metallic member 23 on the other end. Then, one side surface of the intermediate metallic member 23 of the joined assembly is integrally bonded to the tip end of the rocker arm corresponding to the aluminum member 24.

In the following, effects of the ceramic-metal composite body according to the present invention will be concretely shown with respect to experimental results.

(EXAMPLE 1)

As a ceramic member, a disc having a diameter of 10 mm and a thickness of 10 mm was prepared from silicon nitride according to a pressure-less sintering method. As a ferrous metal member, a disc having a diameter of 10 mm and 3 mm in thickness was prepared from a Kovar alloy having a chemical composition mainly consisting of 29 wt % of Ni, 17 wt % of Co, and the balance being Fe. A disc having a diameter of 10 mm and a thickness of 5 mm was prepared from pure aluminum (JIS: 1050) as an intermediate metallic member. Further, as an aluminum member, a rod having a diameter of 18 mm and a length of 100 mm was cast from an aluminum alloy (JIS: AC 8A), and a round bar having a diameter of 10 mm and a length of 50 mm was prepared from the thus cast rod.

The ceramic-metal composite body according to the present invention was obtained by joining the above members together in the following manner, and a test piece for a joining strength measurement was prepared from the ceramic-metal composite body.

First, the Kovar disc was bonded to the opposite surfaces of the silicon nitride disc by using an active metal solder. The joining was effected by heating at 850° C. in a vacuum while the active metal solder was held between the silicon nitride disc and the Kovar disc. This active metal solder was obtained by vapor-depositing metallic titanium onto a 0.1 mm thick silver solder plate (JIS: BAg8) in a thickness of 0.01 mm.

Next, the pure aluminum disc was bonded onto each of the remaining surfaces of the Kovar discs bonded to the opposite surfaces of the silicon nitride disc by using an aluminum alloy solder. The bonding was effected by heating at 600° C. in vacuum while the 0.1 mm thick aluminum alloy solder (JIS: BA 4004) was held between the Kovar disc and the aluminum disc.

As mentioned above, a joined assembly was formed in which the discoidal intermediate metallic member of pure aluminum was bonded to each of the opposite surfaces of the discoidal ceramic member of silicon nitride through the discoidal ferrous metal member of Kovar.

Lastly, the aluminum member was bonded to the intermediate metallic member of pure aluminum positioned at each of the opposite sides of the assembly through argon arc welding, thereby obtaining the ceramic-metal composite body according to the present invention in which the ceramic member was integrally joined to the aluminum member through the ferrous metal member and the intermediate metallic member. The outer periphery of the ceramic-metal composite body was machined to prepare a test piece having a diameter of 9 mm and a length of about 126 mm to be used in a bonding strength measurement. When the test piece was subjected to a tensile test at room temperature, the test piece had a bonding strength of 7 kg/mm$^2$ and was broken from a joint between the Kovar member and the pure aluminum intermediate metallic member.

(EXAMPLE 2)

As a ceramic member, a disc having a diameter of 10 mm and a thickness of 10 mm was prepared from zirconia ceramics containing yttria. As a ferrous metal member, a disc having a diameter of 10 mm and a thickness of 3 mm was prepared from spheroidal graphite cast iron. As an intermediate metallic member, a disc having a diameter of 10 mm and a thickness of 5 mm was prepared from an aluminum alloy (JIS: 3003). Further, as an aluminum member, a rod having a diameter of 18 mm and a length of 100 mm was cast from an aluminum alloy (JIS: AC8A), and a round bar having a diameter of 10 mm and a length of 50 mm was prepared from the thus cast round rod.

A ceramic-metal composite body according to the present invention was obtained by joining the above members together in the below-mentioned manner, and a test piece to be used in the bonding strength measurement was prepared from the ceramic-metal composite body. First, after the opposite surfaces of the zirconia ceramic disc were metallized by a method described in U.S. Pat. No. 4,485,150, the above spheroidal graphite cast iron disc was bonded to each of the metallized surfaces of the ceramic member with a silver solder (JIS: BAg8). The bonding was carried out by heating at 850° C. in a vacuum.

Next, the aluminum alloy disc was bonded to each of the remaining surfaces of the spheroidal graphite cast iron discs by using an aluminum alloy solder.

After nickel was plated on the surfaces of the spheroidal graphite cast iron disc, the above bonding was carried out by heating at 600° C. in a vacuum while a 0.1 mm thick aluminum alloy solder (JIS: BA 4004) was held between the nickel-plated surface and the aluminum alloy disc.

Thus, a joined assembly was obtained, in which the discoidal intermediate metallic member was bonded to each of the opposite surfaces of the discoidal ceramic member made of zirconia ceramics through the discoidal ferrous metal member made of the spheroidal graphite cast iron.

Finally, the intermediate metallic member of the aluminum alloy at the opposite side surfaces of the joined assembly was bonded to the aluminum member by argon arc welding, thereby preparing the ceramic-metal composite body according to the present invention in which the ceramic member was integrally bonded to the aluminum member through the ferrous metal member and the intermediate metallic member.

The outer periphery of the ceramic-metal composite body was machined to obtain a test piece having a diameter of 9 mm and a length of about 126 mm for the bonding strength measurement. When the test piece was subjected to a tensile test at room temperature, the ceramic-metal composite body had a bonding strength of 6 kg/mm$^2$ and was broken from a joint between the base member of the spheroidal graphite cast iron and the intermediate metallic member made of the aluminum alloy.

As mentioned in the foregoing, the following conspicuous effects can be obtained by the ceramic-metal composite body according to the present invention.

(a) The aluminum member can be bonded to the ferrous metal member having a melting point higher than that of aluminum through an intermediate metallic member.

(b) The ceramic member can be bonded to the aluminum member with a ferrous metal member being interposed and an intermediate metallic member being interposed therebetween.

(c) As a result, the ceramic member can be easily bonded to the aluminum member, and the ceramic-metal composite body having heat resistance, wear resistance and corrosion resistance as attributes of ceramics as well as light weight and high toughness as attributes of the aluminum can be easily produced as mechanical structural parts.

The ceramic-metal composite bodies according to the present invention can be used as internal combustion engine parts such as pistons, rocker arms, cylinder heads, etc., as well as general industrial mechanical parts by utilizing their properties.

What is claimed is:

1. A ceramic-metal composite body comprising:
   (a) a ceramic member;
   (b) a ferrous metal member joined to said ceramic member;
   (c) an intermediate metallic member joined to said ferrous metal member; and
   (d) an aluminum member bonded to said intermediate metallic member by welding.

2. A ceramic-metal composite body according to claim 1, wherein the intermediate metallic member is at least one metal selected from the group consisting of aluminum, aluminum alloys, copper, copper alloys, silver and silver alloys and has a melting point which is lower than that of the ferrous metal member and equal to or higher than that of the aluminum member.

3. A ceramic-metal composite body according to claim 1, wherein the ceramic member is at least a part of a piston head for an internal combustion engine.

4. A ceramic-metal composite body according to claim 1, wherein the ceramic member is at least part of a cam-contacting face of a rocker arm for an internal combustion engine.

* * * * *